United States Patent
Huang et al.

(10) Patent No.: US 7,787,457 B2
(45) Date of Patent: Aug. 31, 2010

(54) LABEL ASSIGNING METHOD, LABEL REPLACING METHOD AND LABEL SWITCHING ROUTER

(75) Inventors: Zheng Huang, Shenzhen (CN); Zhangzhen Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 198 days.

(21) Appl. No.: 12/172,402

(22) Filed: Jul. 14, 2008
(Under 37 CFR 1.47)

(65) Prior Publication Data
US 2009/0016341 A1 Jan. 15, 2009

Related U.S. Application Data

(63) Continuation of application No. PCT/CN2006/003163, filed on Nov. 24, 2006.

(30) Foreign Application Priority Data

Apr. 27, 2006 (CN) .................. 2006 1 0076080

(51) Int. Cl.
*H04L 12/28* (2006.01)
(52) U.S. Cl. .................. 370/390; 370/432; 370/466
(58) Field of Classification Search .................. None
See application file for complete search history.

(56) References Cited

U.S. PATENT DOCUMENTS 6,501,754 B1 * 12/2002 Ohba et al. .................. 370/389
6,501,756 B1 * 12/2002 Katsube et al. .............. 370/392
6,606,318 B2 * 8/2003 Katsube et al. .............. 370/392
6,879,594 B1 * 4/2005 Lee et al. .................... 370/408
7,281,058 B1 * 10/2007 Shepherd et al. ............ 709/238

(Continued)

FOREIGN PATENT DOCUMENTS

JP 2005072906 3/2005

OTHER PUBLICATIONS

Xu, J. et al., "An aggregated-based multicast strategy for MPLS", Wireless communications, networking and mobile computing 2005; Proceedings Int Conference, vol. 2, pp. 1044-1046; XP010856327; ISBN#978-0-7803-9335-6.
Oh et al., "Scalable mpls multicast using label aggregation in Internet broadcasting systems", 10th int conference 2003, vol. 1, pp. 273-280; XP010637820; ISBN#978-0-7803-7661-8.

(Continued)

*Primary Examiner*—Bob A Phunkulh
(74) *Attorney, Agent, or Firm*—Brinks Hofer Gilson & Lione

(57) ABSTRACT

A label assigning method for use when a label being used in a unicast Label Switched Path (LSP) between an upstream Label Switching Router (LSR) and a downstream LSR is to be used in a multicast LSP between the upstream LSR and the downstream LSR. The assignment method includes the steps of releasing the label in the unicast LSP, and assigning the label to the multicast LSP. A label replacing method for use when a first label being used in a unicast LSP between an upstream LSR and a downstream LSR is to be used in another LSP between the upstream LSR and the downstream LSR. The replacement method includes the steps of re-assigning a second label for the unicast LSP and releasing the first label in the unicast LSP. These two processes are directed to efficiently establishing a multicast LSP when a conflict of labels occurs between the multicast LSP and an existing unicast LSP.

14 Claims, 6 Drawing Sheets

U.S. PATENT DOCUMENTS

| | | |
|---|---|---|
| 7,570,649 B2 * | 8/2009 | Qian et al. .................. 370/400 |
| 2001/0033574 A1 | 10/2001 | Enoki et al. |
| 2002/0176370 A1 * | 11/2002 | Ohba et al. ................. 370/252 |
| 2005/0125490 A1 * | 6/2005 | Ramia ........................ 709/202 |
| 2005/0169270 A1 * | 8/2005 | Mutou et al. ............... 370/390 |
| 2006/0159009 A1 * | 7/2006 | Kim et al. .................. 370/216 |
| 2006/0193332 A1 * | 8/2006 | Qian et al. .................. 370/397 |
| 2006/0221867 A1 * | 10/2006 | Wijnands et al. ............ 370/255 |
| 2007/0217415 A1 * | 9/2007 | Wijnands et al. ............ 370/390 |

OTHER PUBLICATIONS

Boudani et al., "An effective solution 1-15 for Multicast scalability: The MPLS Multicast Tree (MMT); draft-boudani-mpls-multicast-tree-06.txt", internet engineering task force, IETF, Ch No. 6; 2004-XP015011060: ISSN# 0000-0004.

Li, et al, 2005. "Mergence of MPLS and IP multicast technology". Telecommunications Technology 2005, No. 3: 57-60.

Jiang, et al, 2006. "Survery of MPLS multicast traffic engineering". IT Age 2006, No. 1: 69-73.

* cited by examiner

Fig. 10
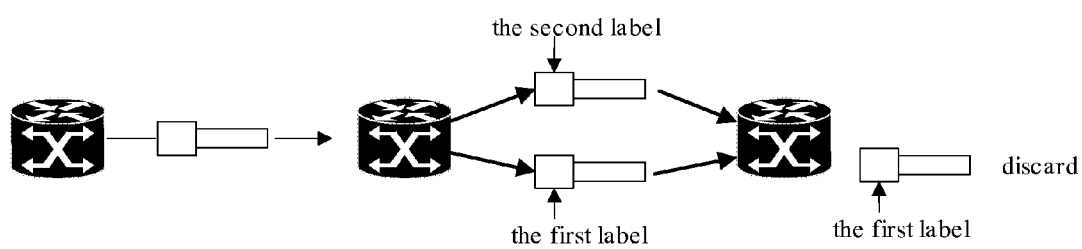
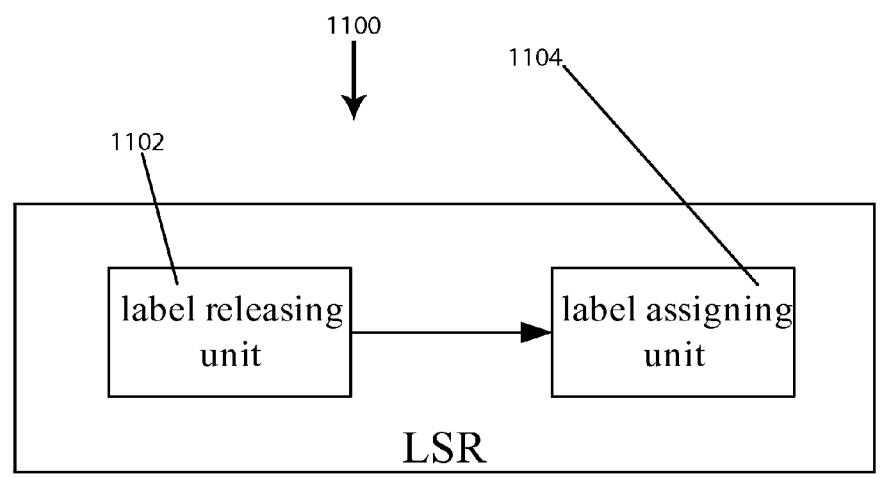
Fig. 11

LABEL ASSIGNING METHOD, LABEL REPLACING METHOD AND LABEL SWITCHING ROUTER

CROSS REFERENCE TO RELATED APPLICATIONS

This application is a Continuation of PCT/CN2006/003163, filed on Nov. 24, 2006, and claims the benefit of Chinese Patent Application No. 200610076080.4, filed on Apr. 27, 2006, both of which are incorporated in their entireties herein. The PCT application published in Chinese on Nov. 8, 2007 as WO 2007/124628 A1.

FIELD OF THE INVENTION

The present invention relates to a multicast communication technology, and more particularly, to a label assigning method, a label replacing method and a label switching router in multicast communication.

BACKGROUND OF THE INVENTION

At present, a multicast communication technology has become a hot technology in network applications due to its capability of conveying copies of the same information to a plurality of destinations. Multi-Protocol Label Switching (MPLS) technology extends Label Distribution Protocol (LDP) and Resource Reservation Protocol-Traffic Engineering (RSVP-TE) to support MPLS multicast trees. In the MPLS technology, a MPLS Label Switched Path (LSP) may be established through MPLS signaling such as LDP protocol. A packet is classified with a "Forwarding Equivalence Class (FEC)" as it enters the network, and a corresponding label is attached to the packet. The label is sent along with the packet while the packet is forwarded to its next hop. After receiving an MPLS packet, an intermediate Label switching Router (LSR) forwards the packet directly according to the label contained in the packet header without retrieving the destination node using the Internet Protocol (IP) address contained in the IP packet header.

In order to obtain a more efficient multicast transmission with simplified operations, a multicast application in LSP tunnels or multi-access links generally adopts a label assignment technology to ensure that all the LSRs at the next hop in the multicast application use the same label.

Current label assignment may adopt upstream label assignment, or upstream-suggested downstream label assignment. In the upstream label assignment, an upstream LSR in a multicast LSP assigns a common label for all the downstream LSRs at the next hop. In the downstream label assignment, the label to be assigned is suggested by the upstream LSR, and all the LSRs at the next hop assign the same label suggested by the upstream LSR.

FIG. 1 is a flowchart illustrating the signaling procedure of a downstream label assigning method according to the prior art. Referring to FIG. 1, the downstream label assigning method in the prior art includes the following steps.

In block 101, a downstream LSR 12 requests an upstream LSR 14 through a label mapping message carrying a specific label to suggest a label for the next hop, wherein the specific label indicates that the downstream LSR 12 is instructing the upstream LSR 14 to suggest a label.

In block 102, the upstream LSR 14 transmits a suggested label to the downstream LSR 12 in a label request message.

In block 103, the downstream LSR 12 returns a label mapping message to the upstream LSR 14 indicating that the label suggested by the upstream LSR is adopted.

FIG. 2 is a schematic diagram illustrating a network scenario in which unicast and multicast co-exist. As shown in FIG. 2, a unicast LSP 22 passes through router R2, router R9, router R10 and router R5 in sequence, and the label assigned to router R10 is label K. A path of a multicast LSP 24 passes through router R1, to router R9 and then to router R3 and router R7 in parallel, and the label assigned to router R3 and router R7 is also the label K.

When router R10 attempts to join the multicast LSP, all the downstream LSRs of router R9 have to use the same label, i.e. router R10 has to use the same label K as router R3 and router R7. However, since the unicast LSP exists prior to the multicast LSP and the label used by router R10 in the unicast LSP is the same label K which is to be used by router R10 in the multicast LSP, a conflict of the label K may arise when router R10 joins in the multicast. A current solution of a conflict of labels is to abort the establishment of the multicast LSP, and to establish a new unicast LSP between router R9 and router R10 to transmit the multicast data. Thus, the multicast data must be transmitted through the unicast path, which makes the procedure more complex.

SUMMARY

In view of the above, the present invention provides a label assigning method so as to ensure that a multicast LSP be established successfully when a conflict of label occurs.

The label assigning method according to the present invention includes the following steps:

when a label being used in a unicast Label Switched Path, LSP, between an upstream Label Switching Router, LSR, and a downstream LSR is to be used in a multicast LSP between the upstream LSR and the downstream LSR, releasing the label in the unicast LSP, and assigning the label to the multicast LSP.

The present invention also provides a label replacing method to replace a unicast label when the unicast label conflicts with a multicast label. The method includes the following steps:

when a first label being used in a unicast Label Switched Path, LSP, between an upstream Label Switching Router, LSR, and a downstream LSR is to be used in another LSP between the upstream LSR and the downstream LSR, re-assigning a second label for the unicast LSP and releasing the first label in the unicast LSP.

Furthermore, the present invention also provides a Label Switching Router (LSR) to release a unicast label when the unicast label conflicts with a multicast label. The LSR includes a label releasing unit and a label assigning unit, in which:

the label releasing unit is adapted to release a label being used in a unicast Label Switched Path, LSP, when the label is to be used in a multicast LSP; and the label assigning unit is adapted to assign the label to the multicast LSP when determining that the label in the unicast LSP has been released.

According to the present invention, a multicast LSP can be established successfully when a conflict of label occurs. In particular, the present invention has the following traits. When a unicast label conflicts with a multicast label, the unicast label will be replaced, i.e. the unicast label is first released, the downstream LSR then assigns a new label for the unicast, and the conflicting label is re-assigned to the multicast. As a result, the conflict between the unicast label and the multicast label can be solved effectively, and the multicast LSP can be established successfully, thereby avoiding the multicast data stream being transmitted through a unicast path and accordingly simplifying the transmission process.

BRIEF DESCRIPTION OF THE DRAWINGS

The invention will become more readily apparent from the Detailed Description of the Invention, which proceeds with reference to the drawings, in which:

FIG. 10 is a schematic diagram illustrating a data stream in a unicast label replacing process in accordance with a third embodiment of the present invention; and FIG. 11 is a schematic diagram illustrating a structure of a label switching router according to the present invention.

DETAILED DESCRIPTION OF THE INVENTION

The present invention provides a label assigning method in which a unicast label is replaced when the unicast label conflicts with a multicast label, i.e. the unicast label and the multicast label are the same label. The present invention also provides a label replacing method in which a downstream LSR interacts with an upstream LSR to assign a new label for a unicast LSP between the two LSRs and to release a conflicting label in the unicast LSP when a conflict of label occurs.

Figure 3:
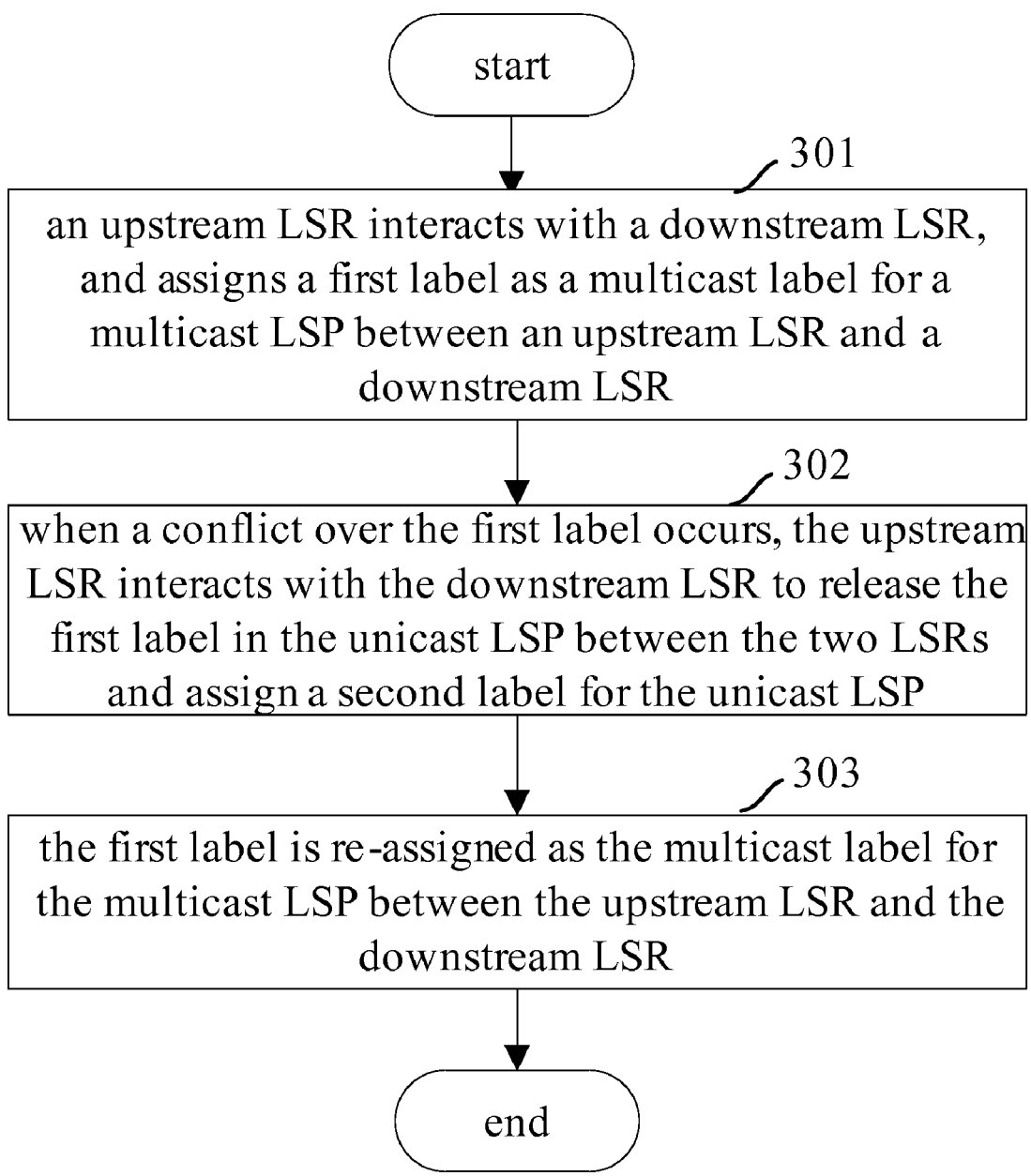
FIG. 3 is a flowchart illustrating a label assigning method according to the present invention.

FIG. 3 shows a label assigning method in accordance with the present invention. As shown in FIG. 3, the label assigning method includes the following steps.

In block 301, an upstream LSR interacts with a downstream LSR, and assigns a first label as a multicast label for a multicast LSP between the upstream LSR and the downstream LSR.

In block 302, when a label being used in a unicast LSP between the upstream LSR and the downstream LSR is the same as the first label assigned for the multicast LSP between the two LSRs, a conflict of labels occurs. The upstream LSR interacts with the downstream LSR to replace the first label in the unicast LSP between the two LSRs and assign a second label for the unicast LSP.

In block 303, the first label is re-assigned as the multicast label for the multicast LSP between the upstream LSR and the downstream LSR.

In other words, when a unicast label conflicts with a multicast label, the unicast label is replaced (i.e. the unicast label is released) and the downstream LSR next assigns a new unicast label and then re-assigns the conflicting label for the multicast. Therefore, the conflict between the unicast label and the multicast label can be resolved effectively so that the multicast tree can be established successfully without transmitting the multicast data stream in a unicast path, and the transmission process can be simplified accordingly.

Figure 1:
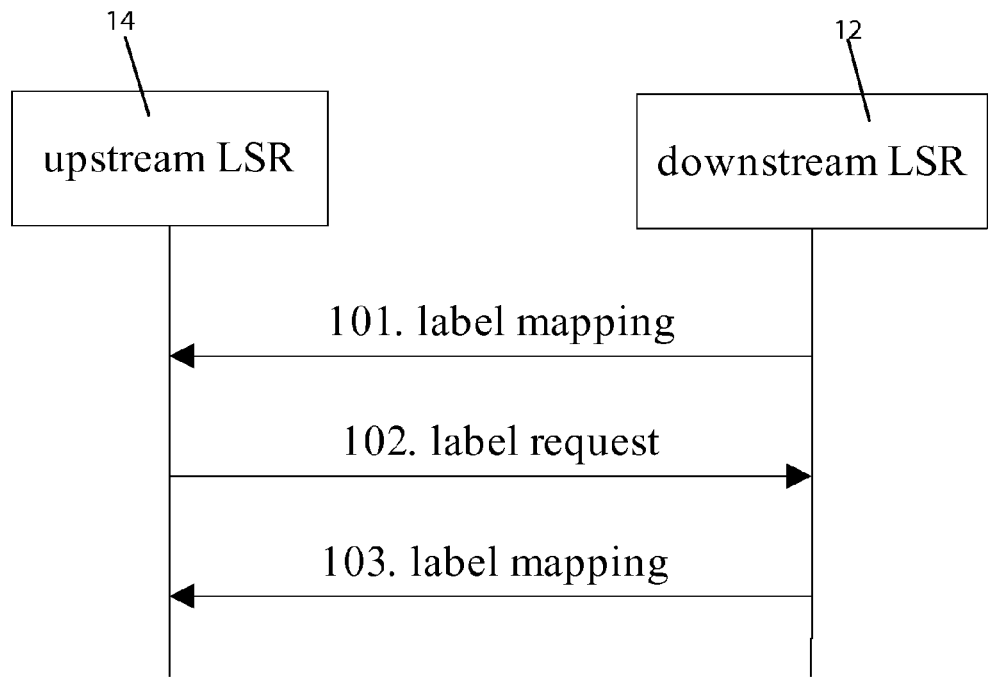
FIG. 1 is a sequence diagram illustrating a signaling procedure of an upstream-suggested downstream label assigning method according to the prior art.
Figure 2:
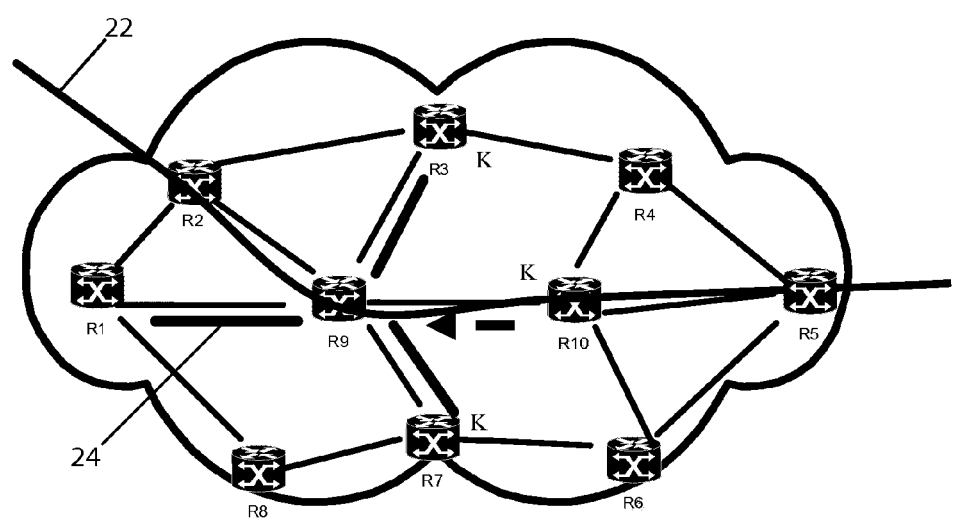
FIG. 2 is a schematic diagram illustrating a network structure in which unicast and multicast co-exist.

A label assigning method in accordance with the disclosed embodiments of the present invention is described hereinafter, using the LDP protocol as an example. The typical network scenario in the following embodiments is as shown in FIG. 2 with router R9 as the upstream LSR and router R10 as the downstream LSR. The conflicting label is called a "first label" and the new label to be assigned is called a "second label". A unicast LSP and a multicast LSP exist between router R9 and router R10 and belong to a same physical link.

Embodiment 1

According a first embodiment of the present invention, labels are typically assigned by upstream LSRs, a unicast label will be replaced when a conflict of labels occurs, and releasing of the unicast label is performed before re-assignment. The present embodiment includes two modes: an upstream on-demand assignment, and an upstream unsolicited assignment.

Figure 4:
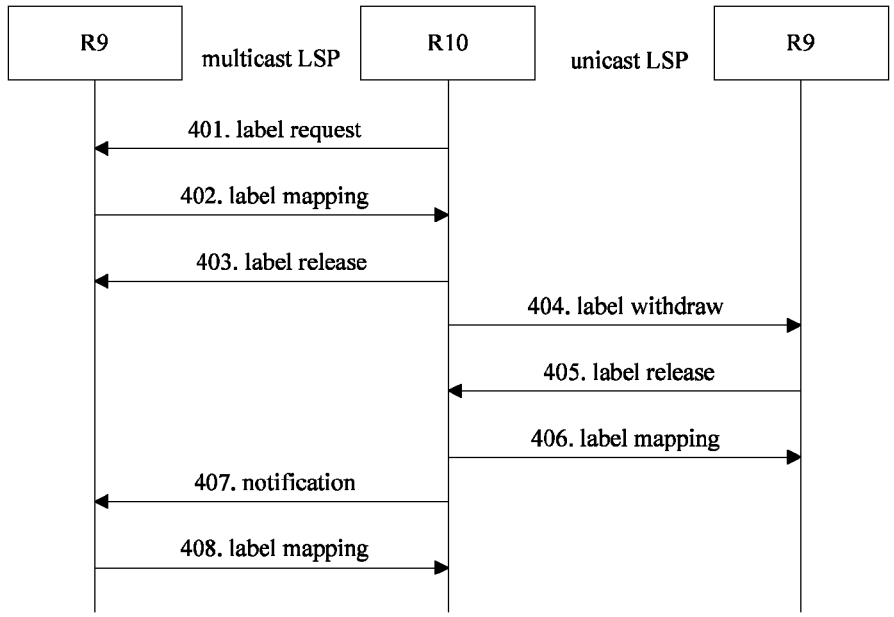
FIG. 4 is a sequence diagram illustrating a signaling procedure of an upstream on-demand label assigning method in accordance with a first embodiment of the present invention.

FIG. 4 is a sequence diagram illustrating a signaling procedure of an upstream on-demand label assigning method in accordance with the first embodiment. Referring to FIG. 4, the upstream on-demand label assigning method includes the following steps.

In blocks 401-402, router R10 transmits a label request message (Label Request) through a multicast LSP to router R9 requesting router R9 to assign a label for the multicast. Router R9 returns a label mapping message (Label Mapping) carrying the assigned label, e.g. the first label, to router R10 through the multicast LSP.

In block 403, when detecting a conflict of labels, router R10 transmits a label release message (Label Release) through the multicast LSP to router R9 indicating that the received label has been released.

In the current block, router R10 compares the received label (i.e. the first label) with the unicast labels in use locally, determines that a conflict of label occurs when two labels are the same, and releases the first label in the multicast LSP.

In blocks 404-406, router R10 transmits a label withdraw message (Label Withdraw) carrying the first label through the unicast LSP to router R9 instructing router R9 to withdraw the first label. Router R9 responds to router R10 with a label release message indicating that the first label has been released, so that the unicast LSP will no longer use the first label which is in conflict. Then router R10 assigns a second label as a new label for the unicast LSP and transmits a label mapping message carrying the second label through the unicast LSP to router R9.

After receiving the second label, router R9 forwards unicast packets using the second label. Blocks 404-406 together represent a label replacing process.

In blocks 407-408, router R10 transmits a notification message (Notification) through the multicast LSP to router R9, indicating that the first label in conflict is available. Router R9 transmits a label mapping message carrying the first label through the multicast LSP to router R10 to re-assign the first label as the multicast label for the multicast LSP between router R9 and router R10.

In the above two blocks, the first label has been released in the unicast LSP when router R10 obtains the second label, thus can be used in the multicast communication and router R9 attaches the first label again to the multicast LSP. In this way, the multicast tree is established successfully, and router R10 uses different labels in the unicast communication and the multicast communication. Thus both communications go along normally.

Herein, the upstream on-demand label assigning process according to an embodiment of the present invention is completed.

Figure 5:
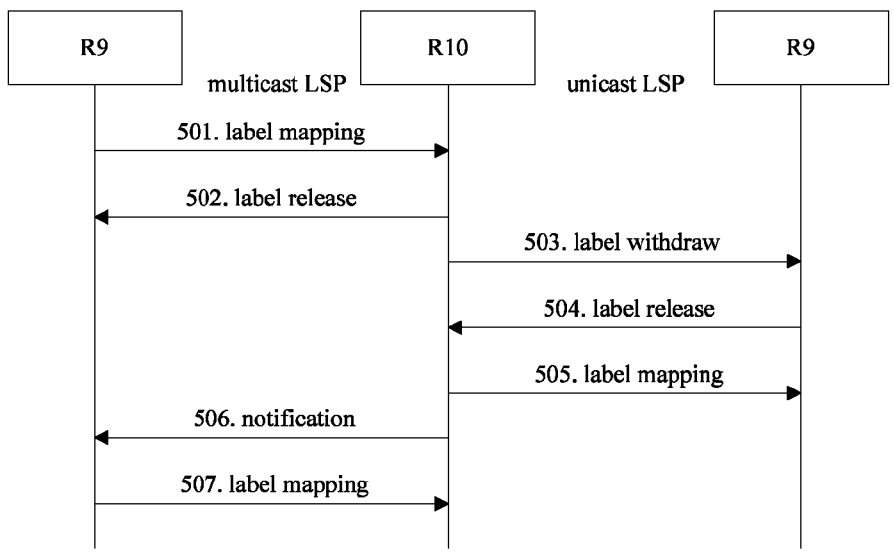
FIG. 5 is a sequence diagram illustrating a signaling procedure of an upstream unsolicited method for label assignment in accordance with a first embodiment of the present invention.

FIG. 5 is a sequence diagram illustrating the signaling procedure of an upstream unsolicited label assigning method according to the present embodiment. Referring to FIG. 5, the upstream unsolicited label assigning method includes the following steps:

In blocks 501-502, router R9 transmits a label mapping message carrying a first label assigned for a multicast path through a multicast LSP to router R10. When detecting a conflict of labels, router R10 transmits a label release message through the multicast LSP to router R9 indicating that the received label has been released.

In blocks 503-505, router R10 transmits a label withdraw message carrying the first label through a unicast LSP to router R9 instructing router R9 to withdraw the first label. Router R9 responds router R10 with a label release message indicating that the first label has been released. Router R10 assigns a second label as a new label for the unicast and transmits a label mapping message carrying the second label through the unicast LSP to router R9.

After router R9 receives the new unicast label, the unicast LSP between router R9 and router R10 uses the second label as the unicast label.

Blocks 503-505 together represent the label replacing process.

In blocks 506-507, router R10 transmits a notification message through the multicast LSP to router R9 indicating that the first label which was in conflict is available. Router R9 transmits a label mapping message carrying the first label through the multicast LSP to router R10 to re-assign the first label as the multicast label for the multicast LSP between router R9 and router R10.

Herein, the upstream unsolicited label assigning process according to the present embodiment is completed.

The upstream unsolicited assignment is different from the upstream on-demand assignment in that router R9, i.e. the upstream LSR, performs the label mapping unsolicited without a request from router R10.

As can be seen from the above processes, when a unicast label is in conflict with a multicast label, the unicast label is replaced (i.e. the unicast label is released), and the downstream LSR assigns a new label for the unicast. The conflicting label is then re-assigned for the multicast, which ensures the multicast tree can be established successfully.

Embodiment 2

According to the second embodiment of the present invention, labels are assigned by downstream LSRs, a unicast label will be replaced when a conflict of label occurs, and the release of the unicast label is performed prior to re-assignment. According to this embodiment of the present invention, there are two modes: a downstream on-demand assignment and a downstream unsolicited assignment. In the above two modes, labels are assigned based on the suggestion from the upstream LSR.

Figure 6:
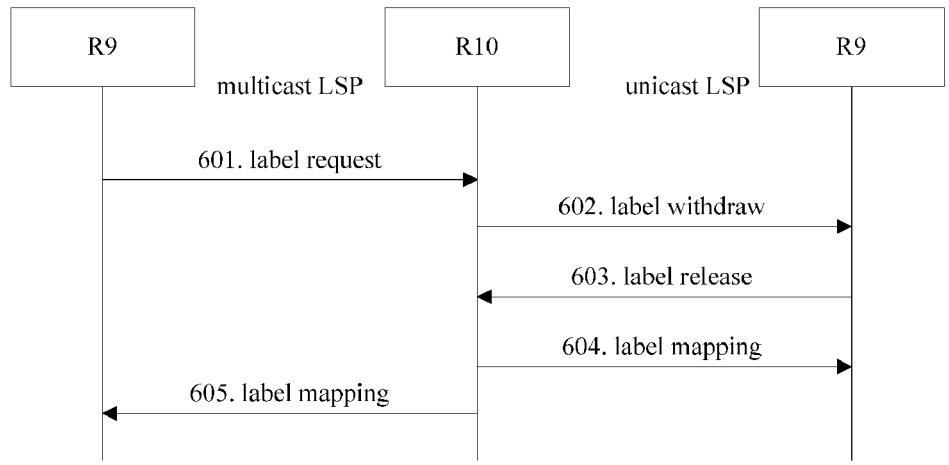
FIG. 6 is a sequence diagram illustrating a signaling procedure of a downstream on-demand label assigning method in accordance with a second embodiment of the present invention.

FIG. 6 is a sequence diagram illustrating a signaling procedure of a downstream on-demand label assigning method according to the present embodiment. Referring to FIG. 6, the downstream on-demand label assigning method includes the following steps.

In block 601, router R9 transmits a label request message carrying a first label as a suggested label through a multicast LSP to router R10 requesting router R10 to assign a label for the multicast.

In blocks 602-604, when a conflict of labels is detected, router R10 determines that the first label used in a unicast is to be replaced, and transmits a label withdraw message carrying the first label through the unicast LSP to router R9 instructing router R9 to withdraw the first label in the unicast. Router R9 returns a label release message through the unicast LSP to router R10 indicating that the first label has been released in the unicast. When determining the first label in the unicast has been released, router R10 transmits a label mapping message carrying a second label re-assigned for the unicast through the unicast LSP to router R9.

In the label replacing process consisting of the above three blocks, after receiving the label request message from router R9, router R10 parses the message to obtain the first label, compares the first label received with a unicast label being used by router R10, and determines a conflict of label occurs when the two labels are the same. Router R10 determines to replace the unicast label and instructs router R9 to withdraw the first label. When the release of the unicast label is confirmed, router R10 assigns a second label for the unicast and transmits the second label to router R9 to re-establish the unicast communication. The packets are forwarded using the newly-assigned second label in the unicast communication between router R10 and router R9 instead of using the first label in conflict.

In block 605, router R10 transmits a label mapping message carrying the first label through the multicast LSP to router R9, and re-assigns the first label as the multicast label for the multicast LSP between router R9 and router R10.

In block 605, router R10 re-assigns the first label for the multicast LSP between router R9 and router R10 when detecting that the first label in the unicast has been released and is available, thus the multicast tree is established successfully.

Herein, the downstream on-demand label assigning process is completed.

As can be seen from the above process, a downstream LSR in a downstream on-demand assignment waits for a request for the multicast label from the upstream LSR, and assigns the label based on the suggestion of the upstream LSR.

Figure 7:
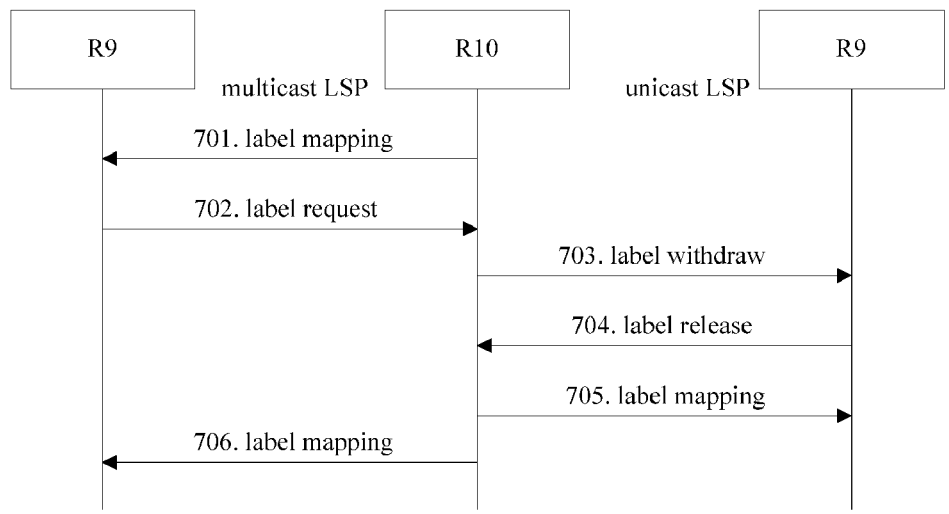
FIG. 7 is a sequence diagram illustrating a signaling procedure of a downstream unsolicited label assigning method in accordance with a second embodiment of the present invention.

FIG. 7 is a sequence diagram illustrating a signaling procedure of a downstream unsolicited label assigning method according to the present embodiment. Referring to FIG. 7, the downstream unsolicited label assigning method includes the following steps:

In blocks 701-702, router R10 transmits a label mapping message carrying a specific label through a multicast LSP to router R9 requesting router R9 to suggest a multicast label. Router R9 returns a label request message carrying a first label through the multicast LSP to router R10 requesting router R10 to assign the multicast label.

In the above two blocks, router R10 initiates an unsolicited label mapping and transmits to router R9 the specific label indicating a request for a label suggestion. Router R9 determines that router R10 is requesting for a label suggestion according to the received specific label, and transmits the first label as the suggested label to router R9.

In blocks 703-705, when detecting a conflict of label occurs, router R10 determines to replace the first label in a unicast, and transmits a label withdraw message carrying the first label through a unicast LSP to router R9 instructing router R9 to withdraw the first label in the unicast. Router R9 returns a label release message through the unicast LSP to router R10 indicating that the first label has been released in the unicast. When determining that the first label in the unicast has been released, router R10 transmits a label mapping message carrying a second label as a re-assigned unicast label through the unicast LSP to router R9.

Through the label replacing process including the above three blocks, the second label is attached to the unicast LSP between router R9 and router R10 and data are forwarded using the second label in the unicast communication.

In block 706, router R10 transmits a label mapping message carrying the first label through the multicast LSP to router R9 to re-assign the first label as the multicast label for the multicast LSP between router R9 and router R10.

The above blocks 703-706 are the same as blocks 602-605 in the downstream on-demand label assigning method according to the present embodiment.

Herein, the downstream unsolicited label assigning process according to the present embodiment is completed.

As can be seen from the above process, a downstream LSR in a downstream unsolicited assignment mold initiates an unsolicited label mapping instead of waiting for the upstream LSR to initiate the label mapping.

According to the present embodiment, when a unicast label is in conflict with a multicast label, the unicast label will be replaced, i.e. the unicast label is released firstly, and the downstream LSR assigns a new unicast label, then the label in conflict is re-assigned for the multicast, thereby the multicast tree can be established successfully.

Embodiment 3

According to the first and second embodiments as described above, when a conflict of labels occurs, the conflicting label is first released and then a new label is assigned for the unicast LSP. That way of releasing a label and re-assigning a new label may interrupt the unicast service temporarily. According to a third embodiment of the present invention, a label smooth-switching is adopted in the label assigning method to ensure the continuity of the unicast service.

According to the third embodiment of the present invention, each LSR maintains two different labels for a single Forwarding Equivalence Class (FEC). Therefore, when a unicast label conflicts with a multicast label at an LSR, a new label is firstly assigned for the unicast LSP and then the label in conflict is released. In this way, the two labels (the old label and the new label) can be used in the unicast simultaneously.

The label assigning method in the third embodiment is described hereinafter using the LDP protocol as an example. According to this embodiment, a list is preset in an upstream LSR(i.e. router R9), to store the two labels obtained from router R10 as output labels, wherein the two labels are called the "first label" and the "second label" respectively.

Figure 8:
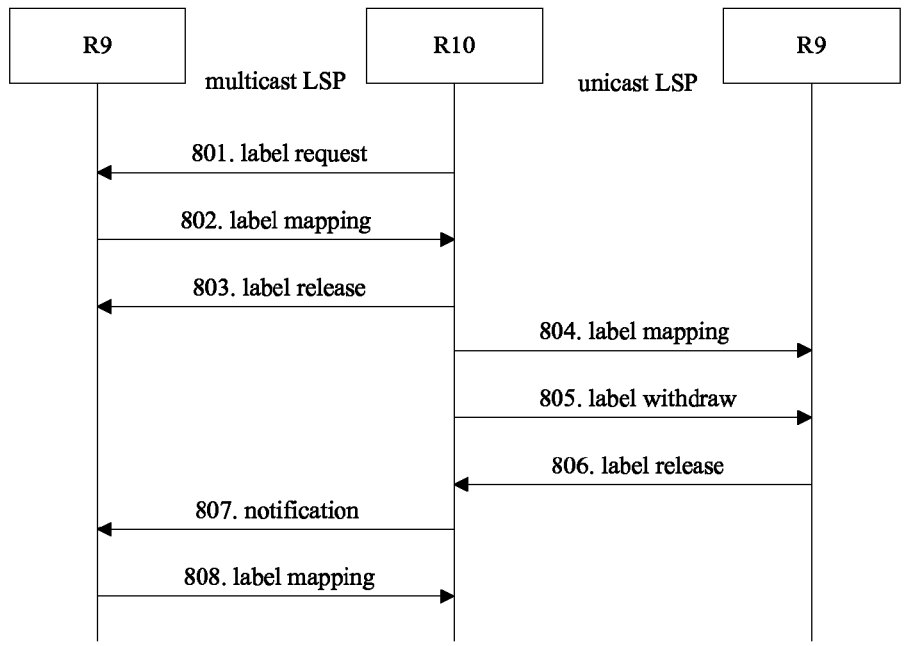
FIG. 8 is a sequence diagram illustrating a signaling procedure of an upstream on-demand label assigning method in accordance with a third embodiment of the present invention.

FIG. 8 is a sequence diagram illustrating a signaling procedure of an upstream on-demand label assigning method according to the present embodiment. Referring to FIG. 8, the upstream on-demand label assigning method according to the present embodiment includes the following steps.

In blocks 801-803, router R10 transmits a label request message through a multicast LSP to router R9 requesting router R9 to assign a label for the multicast. Router R9 returns through the multicast LSP to router R10 a label mapping message carrying the first label assigned. When a conflict of labels is detected, router R10 transmits a label release message through the multicast LSP to router R9 requesting router R9 to release the received label.

The above blocks are the same as the blocks 401-403 in the upstream on-demand label assigning method according to the first embodiment.

In blocks 804-806, router R10 transmits a label mapping message carrying the second label as a newly assigned unicast label through a unicast LSP to router R9. Then router R10 transmits a label withdraw message carrying the first label through the unicast LSP to router R9 requesting router R9 to withdraw the first label in the unicast. Router R9 releases the first label in the unicast according to the label withdraw message and returns a label release message through the unicast LSP to router R10 indicating that the first label in the unicast has been released.

FIG. 10 is a schematic diagram illustrating a data stream in a replacing process of a unicast label according to the third embodiment. Referring to FIG. 10, router R10 assigns a second label for a unicast after determining that a conflict of the first label occurs in the label replacing process. After receiving a label mapping message, router R9 parses the message to obtain the second label, and saves the second label into the output interface list. Since the first label has been saved in the output interface list, the unicast data from router R9 to router R10 are transmitted in two copies which the second label and the first label are attached to respectively until the first label in the unicast is released by router R10 in block 806. The two data copies are of the same data information but with different labels. Moreover, when receiving the two data copies from the unicast LSP, router R10 processes the data copy with the second label and discards the data copy with the first label.

In blocks 807-808, router R10 transmits a notification message through the multicast LSP to router R9 indicating that the conflicting first label is available. Router R9 transmits a label mapping message carrying the first label through the multicast LSP to router R10 to re-assign the first label as the multicast label for the multicast LSP between router R9 and router R10.

The above two blocks are the same as the blocks 407-408 of the first embodiment.

Herein, the upstream on-demand label assigning process according to the present embodiment is completed.

In the upstream unsolicited assignment, router R9 initiates an unsolicited label assignment directly in block 802 without performing the block 801 in which router R10 requests router R9 to assign a label.

Figure 9:
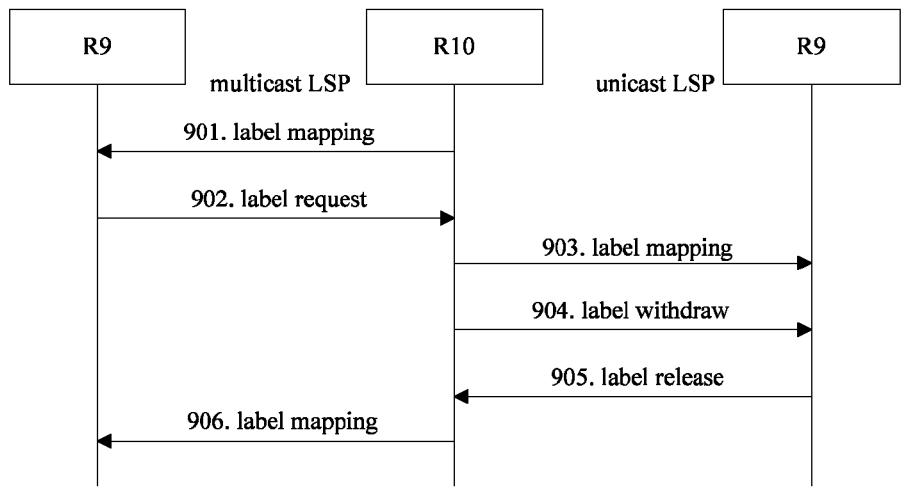
FIG. 9 is a sequence diagram illustrating a signaling procedure of a downstream unsolicited label assigning method in accordance with a third embodiment of the present invention.

FIG. 9 is a sequence diagram illustrating a signaling procedure of a downstream unsolicited label assigning method according to the third embodiment. Referring to FIG. 9, the downstream unsolicited label assigning method includes the following steps.

In blocks 901-902, router R10 transmits a label mapping message carrying a specific label through a multicast LSP to router R9 requesting router R9 to suggest a multicast label. Router R9 returns a label request message carrying the first label through the multicast LSP to router R10 requesting router R10 to assign the multicast label.

The above two blocks are the same as the blocks 701-702 of the second embodiment.

In blocks 903-905, router R10 transmits a label mapping message carrying a second label as a newly assigned unicast label through a unicast LSP to router R10. Then, router R10 transmits a label withdraw message carrying the first label through the unicast LSP to router R9 instructing router R9 to withdraw the first label in the unicast. Router R9 releases the first label in the unicast according to the label withdraw message and returns a label release message through the unicast LSP to router R10 indicating that the first label in the unicast has been released.

The above three blocks are the same as the blocks 804-806 of the present embodiment.

In block 906, router R10 transmits a label mapping message carrying the first label through the multicast LSP to router R9 to re-assign the first label as the multicast label for the multicast LSP between router R9 and router R10.

The current block is the same as the block 706 of Embodiment 2.

Herein, the downstream unsolicited label assigning process according to the present embodiment is completed.

In the downstream on-demand assignment, the block 901 will not be performed. Instead, the upstream LSR (i.e. router R9) will transmit a label request message carrying the first label as the suggested label through the multicast LSP to router R10 requesting router R10 to assign a multicast label for the multicast in block 902.

According to the present embodiment, when a conflict of labels occurs, the downstream LSR (i.e. router R10) transmits a new unicast label to the upstream LSR (i.e. router R9). Before releasing the conflicting unicast label, router R9 generates unicast data in two data copies to which different labels are respectively attached, and transmits the copies downstream. Router R10 processes the data copy with the new label and discards the data copy with the old label until the old label is released. Thus, the unicast service between router R9 and router R10 can be smoothly switched from the old label to the new label, and thereby an interruption of the unicast service due to the label replacing process may be avoided.

As can be seen from the above three embodiments of the present invention, the label replacing process can be implemented in two different ways. One is to first release the conflicting label and then re-assign a new label for the unicast when a conflict of label occurs. The other is to first assign a new label for the unicast LSP and then release the conflicting unicast label when a conflict of label occurs. Both of these label replacing methods can effectively solve the problem of unsuccessful establishment of a multicast tree due to a conflict of label, and can keep the multicast transmission process simple and successful.

The above described embodiments of a label assigning method and a label replacing method according to the present invention take the LDP protocol as an example. However, other label distribution protocols, such as RSVP-TE protocol, can also be adopted in a manner that is consistent with the principles of the present invention.

Furthermore, the present invention provides a Label switching Router (LSR) 1100 corresponding to the method of the present invention. As shown in FIG. 11, the LSR includes: a label releasing unit 1102 and a label assigning unit 1104. The label releasing unit 1102 is adapted to release a first label used in a unicast LSP and to request the label assigning unit 1104 to re-assign a label for the unicast LSP when the first label assigned for a multicast LSP is in conflict with the label used in the unicast LSP. The label assigning unit 1104 is adapted to receive a notification from the label releasing unit 1102 and assign a second label for the unicast LSP after receiving the notification.

Either before or after releasing the first label used in the unicast LSP, the label releasing unit 1102 may request the label assigning unit 1104 to re-assign a label for the unicast LSP.

The label releasing unit 1102 may include a withdraw instruction module (not shown) for instructing the upstream LSR to withdraw a first label in a unicast path through the unicast LSP when the first label assigned for the multicast LSP is in conflict with the label being used in the unicast LSP. After receiving the withdraw instruction, the upstream LSR responds with a label release message indicating that the first label has been released. The label assigning unit 1104 may include a label notification module (not shown) for transmitting the assigned second label through the unicast LSP to the upstream LSR notifying the upstream LSR of the second label being a new label for the unicast LSP after receiving the label release message from the upstream LSR.

The label releasing unit 1102 may release the first label in the multicast LSP before releasing the first label in the unicast LSP. After assigning the second label for the unicast LSP, the label assigning unit may notify the upstream LSR of the conflicting first label being available through the multicast LSP, and the upstream LSR re-assigns the first label for the multicast LSP.

The LSR further includes a data processing unit (not shown) adapted to receive from the upstream LSR two data copies which a first label and a second label are respectively attached to, and process the data copy with the second label and discard the data copy with the first label.

The above are only exemplary embodiments of the present invention presented for the purpose of illustrating the present invention and are not intended to limit the protection scope thereof beyond what is claimed by the claims. All modifications, equivalents, or improvements that do not depart from principles of the present invention are intended to be included in the protection scope of the present invention.

The invention claimed is:

1. A label assigning method, comprising:
when a label being used in a unicast Label Switched Path (LSP) between an upstream Label Switching Router (LSR) and a downstream LSR is to be used in a multicast LSP between the upstream LSR and the downstream LSR, assigning a second label to the unicast LSP, releasing the label in the unicast LSP, and assigning the label to the multicast LSP,
wherein assigning a second label to the unicast LSP comprises:
sending, by the downstream LSR, a label mapping message carrying the second label through the unicast LSP to the upstream LSR to assign the second label to the unicast LSP.

2. The method according to claim 1, wherein the step of releasing the label in the unicast LSP further comprises the steps of:
signaling, by the downstream LSR, the upstream LSR to withdraw the label in the unicast LSP;
releasing, by the upstream LSR, the label in the unicast LSP;
signaling, by the upstream LSR, the downstream LSR that the label has been released in the unicast LSP.

3. The method according to claim 1, further comprising the step of:
before releasing the label in the unicast LSP, sending, by the upstream LSR, a label mapping message to the downstream LSR to assign the label to the multicast LSP.

4. The method according to claim 3, further comprising the step of:
  sending, by the downstream LSR, a label release message to the upstream LSR indicating that the label in the multicast LSP has been released.

5. The method according to claim 1, further comprising the step of:
  before releasing the label in the unicast LSP, sending, by the upstream LSR, a label request message to the downstream LSR suggesting the downstream LSR to assign the label to the multicast LSP.

6. The method according to claim 1, further comprising the step of:
  signaling, by the downstream LSR, the upstream LSR that the label is available.

7. The method according to claim 1, wherein the step of assigning the label to the multicast LSP further comprises the step of:
  sending, by the upstream LSR, a label mapping message carrying the label through the multicast LSP to the downstream LSR to assign the label to the multicast LSP.

8. The method according to claim 1, wherein the step of assigning the label to the multicast LSP comprises:
  sending, by the downstream LSR, a label mapping message carrying the label through the multicast LSP to the upstream LSR to assign the label to the multicast LSP.

9. The method according to claim 1, further comprising the step of:
  after releasing the label in the unicast LSP, assigning a second label to the unicast LSP.

10. The method according to claim 1, further comprising the steps of:
  generating, by the upstream LSR, data in two copies which carry the label and the second label respectively, and sending the two data copies through the unicast LSP to the downstream LSR before releasing the first label in the unicast LSP; and
  processing, by the downstream LSR, the data copy with the second label.

11. The method according to claim 10, wherein the generating step further comprises the steps of:
  saving, by the upstream LSR, the label and the second label in a list, and generating the data for the downstream LSR in two copies carrying the labels saved in the list respectively.

12. A label replacing method, comprising the steps of:
  when a first label being used in a unicast Label Switched Path (LSP) between an upstream Label Switching Router (LSR) and a downstream LSR is to be used in another LSP between the upstream LSR and the downstream LSR, re-assigning a second label for the unicast LSP;
  generating, by the upstream LSR, data in two copies which carry the first label and the second label respectively, and sending the two data copies through the unicast LSP to the downstream LSR;
  processing, by the downstream LSR, the data copy with the second label; and
  releasing the first label in the unicast LSP.

13. The method according to claim 12, further comprising the step of:
  signaling, by the downstream LSR, to the upstream LSR that the first label is available.

14. The method according to claim 12, wherein the generating step further comprises the steps of:
  saving, by the upstream LSR, the label and the second label in a list, and generating the data for the downstream LSR in two copies carrying the labels saved in the list respectively.

* * * * *